B. HARNISH & D. H. HARNISH.
Improvement in Animal Traps.
No. 125,290. Patented April 2, 1872.
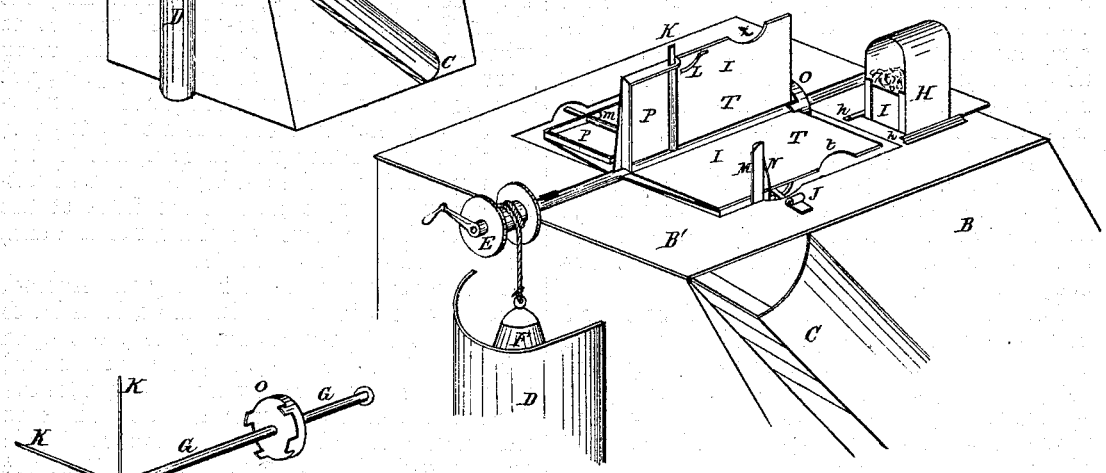

125,290

UNITED STATES PATENT OFFICE.

BENJAMIN HARNISH, OF LANCASTER, AND DAVID H. HARNISH, OF PEQUEA, PENNSYLVANIA.

IMPROVEMENT IN ANIMAL-TRAPS.

Specification forming part of Letters Patent No. 125,290, dated April 2, 1872.

*Know all whom it may concern:*

That we, BENJAMIN HARNISH, of Lancaster, and DAVID H. HARNISH, of Pequea, in the county of Lancaster and State of Pennsylvania, have invented new and useful Improvements in Animal-Traps; and we do declare that the following is a true and accurate description thereof, reference being had to the accompanying drawing and to the letters of reference marked thereon, and being a part of this specification, in which—

Figure 1 is a perspective view of the trap with the cover in place on a reduced scale. Fig. 2 shows the top of the trap-box with the cap or cover A removed. Fig. 3 are detached illustrations, and, like Fig. 2, twice the size shown by Fig. 1.

This invention relates to that class of animal-traps which are provided with tilting platforms in connection with a revolving shaft, weight, and pulley, or what are termed self-setting traps. The novelty consists in the arrangement of the several parts, and their combined action as a whole.

The box B has three vertical sides. On one end there is an open guide-way, D, in which the weight F has its up-and-down motion. On the opposite end there is a glass and sliding door. The remaining side is shown inclined, with a covered step or bait-way, c, for the smaller animals or mice, which may be induced, by scattering feed, to mount to the top. The top B' is centrally open, and has bearings for a horizontal shaft, G, which, with its appliances, can be lifted off. There is also a sliding feed-box, H, which is provided, on the end next the opening in the cap A, with a piece of looking-glass, I. The spring-post M, with its spring and catch N, and set-screw S and lock-catch J, are shown with three of the tilting platforms P, I II IIII, weighted at P for a counterpoise to restore them in place after being sprung, as shown by Fig. 2. The cap A, Fig. 1, covers the whole, and has an open door at each end leading over the tilting platform to the bait or feed-box H, as seen in Fig. 1. This cap is readily set on or taken off by side bolts and catches J. The shaft G has a pulley, E, and winding handle at one end for a cord and weight, F. This shaft G has four radial arms, K, and bearings V for the outer end of said arms, which also project so as to lodge on a catch on the bent spring N attached to the post M. The tilting platforms T are hung on those arms inside of the bearings V near the one end, and counterpoised by a weight, P. Surrounding the shaft G there is a four-toothed ratchet or wheel, O, between which teeth or projecting cogs the platforms have sufficient play, but cannot become wholly disengaged. Underneath each platform there is a bent tripper, L, which in winding up the cord, allows it to pass upward over the spring N. The adjusting-screw S is to regulate the force of the spring. Fig. 3 shows the shaft, radial arms, spring, and appliances in detail.

The operation will be readily understood, and may be briefly stated: That, in order to get to the bait, the animal enters the open passage a in the cap A, and, in going forward toward the bait in H, by its weight, tilts the further end of the platform, which turns on the radial arm K as a pivot, and coming in contact with the projecting cog on O at the same time that the tripper L is brought to bear against the spring N, pushing it in so as to disengage the arm K; consequently, by the action of the weight, the shaft G is revolved quarter round, and the animal, unable to leap off, is precipitated to the box below, and shut up therein by the two platforms opposite each other closing up the trap; which is again set, and will repeat the operation until the weight is run down.

There is also a hook, W, on the under side of the cap A, to which a bait may be affixed adapted for rabbits or other animals. A notch, t, is shown cut out of the platforms T opposite a hook, X, on the under side of the top B, designed for small mice, which might not be able to reach the bait-box, or for a diversity of baiting the same. The platforms can be so nicely adjusted as to yield readily to the smallest animal's weight.

We are aware that there is a great diversity in the arrangement of animal-traps, in which revolving shafts, radial and tilting platforms are combined, and arranged and claimed in a diversity of devices; but we are not aware of any arranged in the manner herein shown and described.

What we claim as our invention, and desire to secure by Letters Patent, is—

1. The notched arresting-wheel O, radial arms K with their outer bearings V, when connected to a revolving shaft, G E, which is provided with a cord and weight, F, and pulley E.

2. Also, in combinations with the radial arms K, the tilting platforms T with their tripper L, spring-catch N, made adjustable by a screw, S, all arranged and operating, jointly, in the manner and for the purpose specified.

B. HARNISH.
      D. H. HARNISH.

Witnesses:
 WM. B. WILEY,
 JACOB STAUFFER.